United States Patent [19]

Hickman

[11] Patent Number: 4,574,707
[45] Date of Patent: Mar. 11, 1986

[54] CONVERTIBLE HIGHWAY RAILROAD VEHICLE

[75] Inventor: Albert F. Hickman, Eden, N.Y.

[73] Assignee: A. F. Hickman Associates, Inc., Trumansburg, N.Y.

[21] Appl. No.: 491,602

[22] Filed: May 4, 1983

Related U.S. Application Data

[63] Continuation-in-part of Ser. No. 239,503, Mar. 2, 1981, Pat. No. 4,397,243.

[51] Int. Cl.⁴ .......................... B60F 1/04; B61F 13/00
[52] U.S. Cl. ........................................ 105/159; 105/3; 105/215 C; 105/224.1; 267/3; 410/53
[58] Field of Search ............... 105/3, 4 R, 4 A, 159, 105/182 R, 199 R, 215 C, 215 R, 224.1, 224 R; 410/1, 28, 30, 45, 53, 56, 65; 267/3, 63 R, 153

[56] References Cited

U.S. PATENT DOCUMENTS

| | | | |
|---|---|---|---|
| 1,821,104 | 9/1931 | McBride | 105/220 |
| 1,994,815 | 3/1935 | Ferrin | 105/215 C |
| 2,963,986 | 12/1960 | Dobson | 105/215 C |
| 3,062,387 | 11/1962 | Lavis et al. | 267/3 |
| 3,762,337 | 10/1973 | McKeon et al. | 105/215 C |
| 4,167,143 | 9/1979 | Bitterberg | 267/3 |
| 4,179,997 | 12/1979 | Kirwan | 105/159 |
| 4,202,454 | 5/1980 | Browne et al. | 105/215 C |
| 4,278,029 | 7/1981 | Eggert, Jr. | 105/224.1 |
| 4,364,315 | 12/1982 | Beatty | 105/215 C |
| 4,397,243 | 8/1983 | Hickman | 105/215 C |

FOREIGN PATENT DOCUMENTS

82849  4/1956  Netherlands .................... 105/224.1

Primary Examiner—Robert B. Reeves
Assistant Examiner—Donald T. Hajec
Attorney, Agent, or Firm—Harold I. Popp

[57] ABSTRACT

A cargo body with a rubber tired truck permanently connected to its rear end, is propelled along the highway by any conventional highway tractor. For rail service the highway truck is cradled in a railroad wheeled truck and the front end of each cargo body is supported on the rear end of its preceding cargo body. Additionally, an array of second stage springs carry the doubled load in rail service, stabilizers are provided for the railroad axles; and a single axle railroad dolly is used to connect the cargo bodies to a locomotive or any of its cars.

4 Claims, 15 Drawing Figures

Fig. 2.

CONVERTIBLE HIGHWAY RAILROAD VEHICLE

This application is a continuation-in-part of my co-pending application Ser. No. 239,503, filed Mar. 2, 1981, now U.S. Pat. No. 4,397,243, issued Aug. 9, 1983, for Convertible Highway Railroad Vehicle.

BACKGROUND OF THE INVENTION

This invention relates to a vehicle which is convertible to both highway and railroad service —to be propelled by any conventional rubber tired highway tractor as well as by any conventional railroad locomotives or its cars. In rail service the vehicles are coupled together in trains.

SUMMARY OF THE INVENTION

A cargo body is provided with mating tongue and socket half couplings at its front and rear ends. These are inoperative in highway service where the rear end is carried by a permanently connected highway truck and the front end by the conventional fifth wheel of any highway tractor.

In rail service, the rubber tired truck of the body is cradled in a railroad truck or bogie. The tongue and socket couplings support the front end of each body on the rear end of the preceding body, so as to eliminate the need for special railroad trucks. The couplings are designed for such heavy duty service.

The railroad truck is unsprung and an array of second stage helical compression springs is provided for rail service only. This is because the railroad truck takes the entire load, whereas in highway service the load is shared by the highway truck and highway tractor. This second stage spring array is rendered inoperative during highway service. This is accomplished by attaching the array to the highway truck in position to engage and be served by the railroad truck when the highway and railroad trucks are nested together.

A low friction spring suspension is also provided for both rail and highway service to reduce the highway destruction and improve fuel mileage.

Rubber rollers and pads are also interposed between each railroad journal box and a surrounding frame. These rubber components (1) exert a downward pressure on each wheel to maintain its contact with the rail at all times; (2) provide self-steering for the tandem railroad axles and provide smooth and non-destructive travel over curves and switches, and (3) provide a limited and controlled degree of axle movement vertically, and lengthwise and transversely of the line of travel. The mountings for the journal boxes also provide for load transfer from wheel to wheel, particularly over rail joints which yield downwardly and, in effect, provide low or soft spots in the railroad track.

A single axle railroad coupler dolly permits coupling of any convertible vehicle to the rear end of any railroad locomotive or its freight or passenger cars. The single axle eliminates the need for turnplates to negotiate switches and curves.

GENERAL COMPONENTS

The cargo containers or bodies A are propelled along the highways B by a conventional highway tractor (not shown) having the usual slotted, tiltable greased plate of a conventional fifth wheel, this plate having a conventional latch for seizing the downwardly projecting pin of any standard highway trailer. As such, the highway tractor can be used with any ordinary highway trailer when not in service with the equipment of the present invention.

These containers or bodies A are propelled along standard railroad tracks C by one or more diesel locomotives (not shown). These locomotives can be coupled, through a single axle railroad dolly D, to the front end of any container or body A.

These railroad dollies D can also be used, in a train of containers A, to couple the front end of the foremost container A to the rear end of a train of conventional freight or passengers cars (not shown).

Along the highways B, the rear end of each container or cargo body A is supported by a permanently connected rubber tired highway truck G, the front end being removably supported on a conventional highway tractor (not shown).

In railroad service, this highway truck G is removably supported on a railroad truck F. Each highway truck G can be dropped onto or lifted from its companion railroad truck F, and each such railroad truck F can be placed on or removed from the railroad track C by conventional lifting or propelling equipment (not shown), or by gravity as described in my said copending application Ser. No. 239,503.

In railroad service, the front end of each container or cargo body A is detachably supported on the rear end of another container or cargo body A and both the highway truck G and the railroad truck F of the latter.

In the following description the designation "front" and "rear" ends of parts refer to the direction of travel.

CONTAINER OR CARGO BODY A—FIGS. 1, 2, 7 and 11–14.

Figures 11, 12, 13, 14:
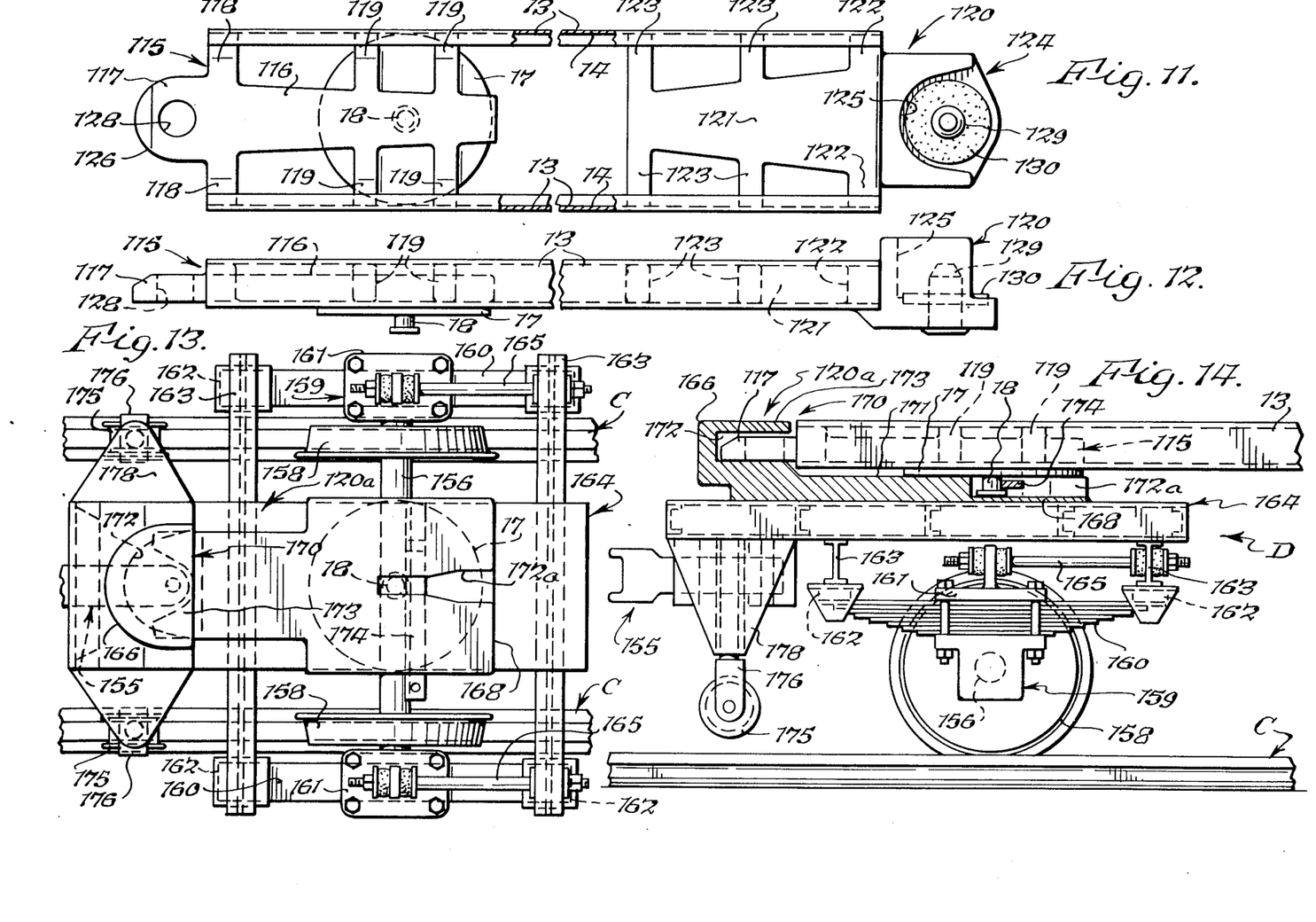
FIG. 11 is an enlarged top plan view of the main longitudinal bottom supporting beams for the cargo carrier and the coupling members at the front and rear end of the cargo carrier.
FIG. 12 is a side elevational view thereof.
FIG. 13 is a top plan view of the single axle railroad coupler dolly used to couple the cargo carriers of the present invention to a conventional railroad locomotive, or to any of its cars.
FIG. 14 is a side elevational view thereof, parts being broken away.

The containers or bodies for transporting cargos are shown in the form of box bodies. Each is carried by a pair of parallel channel beams 13 which extend its full length. These channel beams have their channels 14 facing inwardly as best shown in FIG. 11.

Each body A is equipped in the same manner as any conventional highway trailer for attachment and propulsion by a conventional highway tractor. Thus at its front end it has a conventional telescopic leg 15 with bottom wheels 16 which can be projected downwardly to support the cargo body A while a conventional highway tractor is being backed under it. At its front end it also has, on its underside, a conventional downwardly facing greased fifth wheel plate 17 and a depending central, headed latch pin 18. This fifth wheel plate and its pin are identical to the corresponding parts of a conventional fifth wheel connection between a conventional highway tractor and its trailer.

In rail service, the channels 14 in the opposite ends of the channel beams 13 contain coupler members 115 and 120 which will be described later in detail. These coupler members support the front end of each cargo container A on the rear end of a preceding cargo container A and couple them in a train for rail service.

HIGHWAY TRUCK G—FIGS. 1, 2 and 7–10A

In highway service, the rear end of each container or cargo body A is permanently mounted on the top subframe 19 of its highway truck G. This top subframe includes side channel bars 20 connected at their ends by cross channel bars 21. This top subframe is carried by a tandem axle highway suspension including a pair of tandem axles 22. Each tandem axle is supported at its opposite ends by highway wheels 25. These wheels rotatably support these axles 22 and each includes a rubber tire 26. These wheels can be single or dual tired wheels.

The construction of the tandem axle spring suspension at the right-hand side of the highway truck G is substantially the same as at the left-hand side thereof. Hence a description of the suspension will be deemed to apply to both sides, the same reference numerals being employed.

Figures 9, 10, 10A:
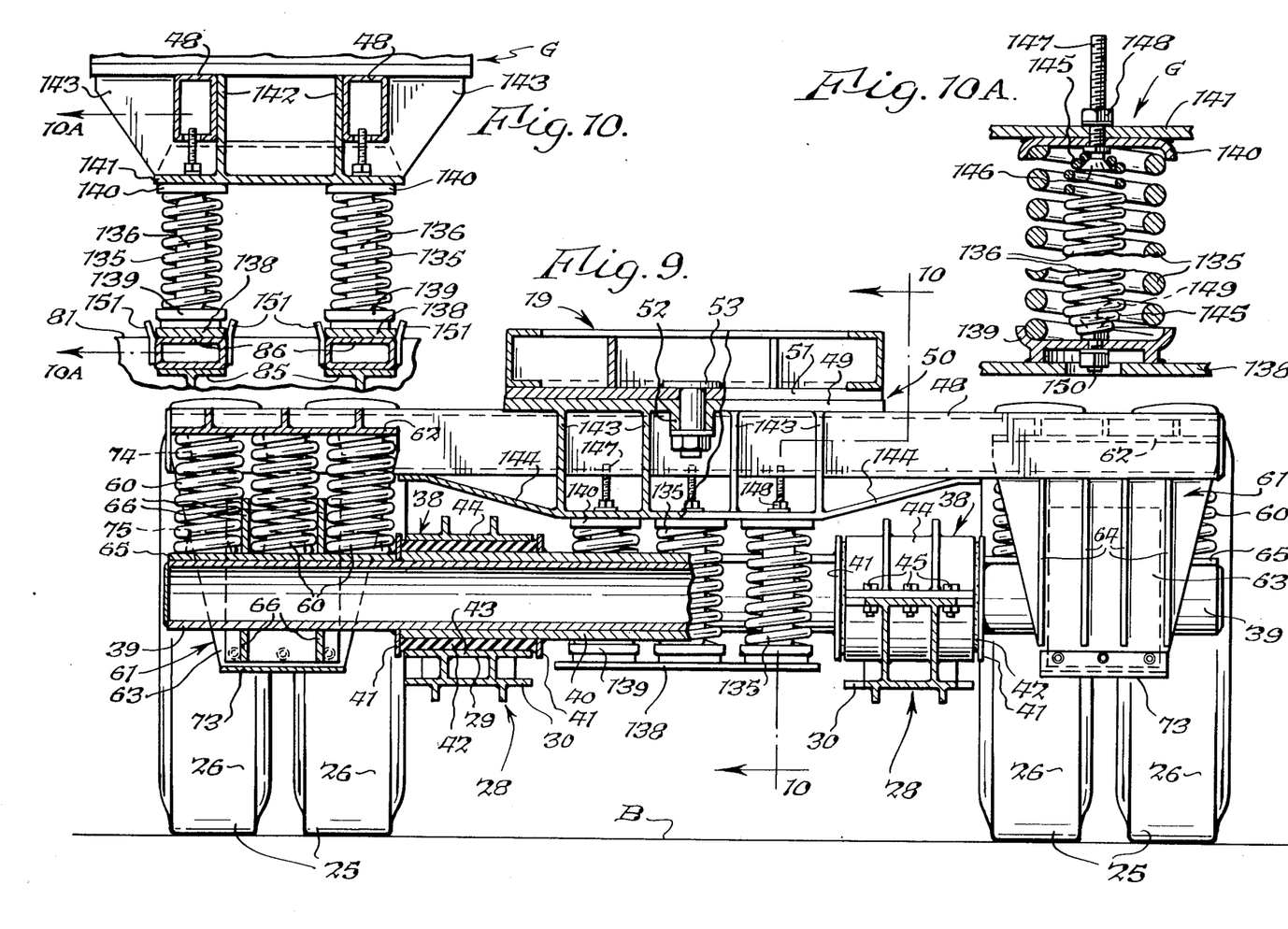
FIG. 9 is a vertical section taken generally on line 9—9, FIG. 8, with parts broken away.
FIG. 10 is an enlarged fragmentary sectional view taken generally on line 10—10, FIG. 9.
FIG. 10A is a further enlarged fragmentary sectional view taken on line 10A—10A, FIG. 10.

Each end of each axle 22 is connected by a rubber bushed bearing, indicated generally at 27, to one end of a horizontal walking beam 28 which forms a major component of the frame of the highway truck G. Each such frame walking beam 28 is of welded box form in cross section, as best shown in FIG. 9. Its central part is larger than its ends. Its top wall is indicated at 29 and its bottom wall at 30. The bottom wall 30 of each walking beam diverged upwardly, as indicated at 31, to provide downwardly facing wedge faces 32. These wedge faces 32 are jointly cradled in upwardly facing wedge faces in the frame of the railroad truck F as hereinafter described.

Figure 7:
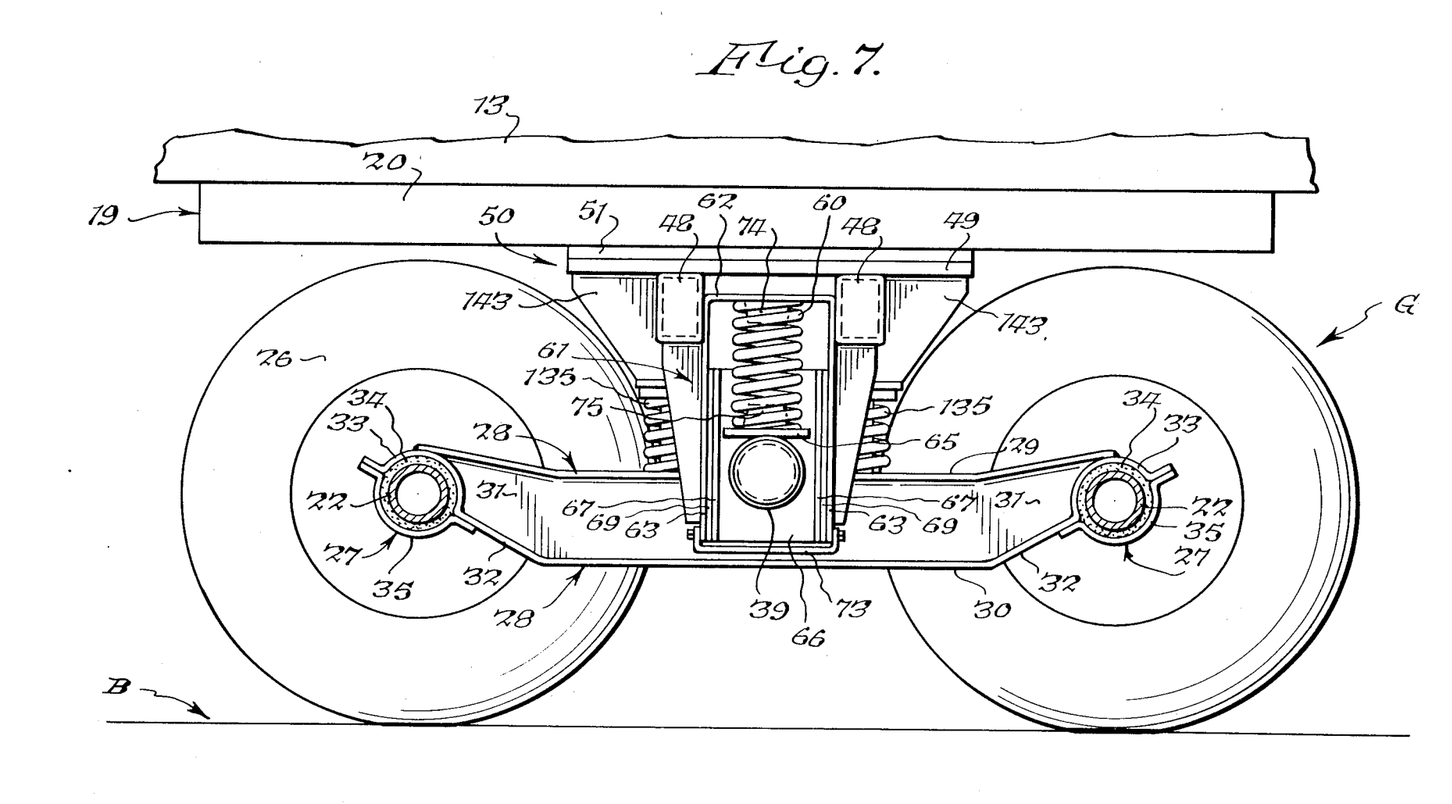
FIG. 7 is a vertical sectional view taken generally on line 7—7, FIG. 8 and showing the spring suspension in elevation.
Figure 8:
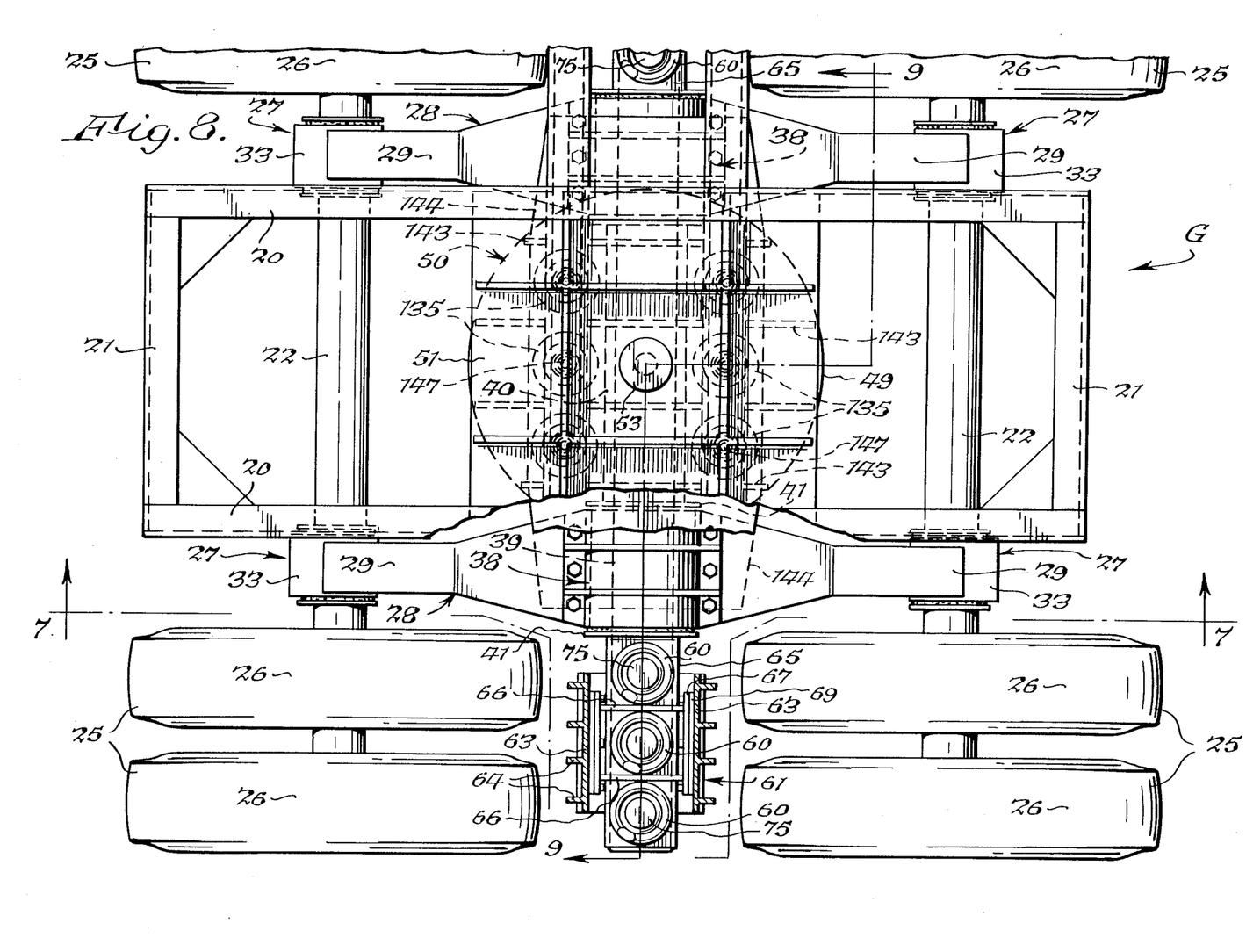
FIG. 8 is a fragmentary top plan view of the rubber tired highway vehicle and the spring suspension therefor, parts being broken away.

Each rubber bushed bearing 27 includes an upper half bearing housing 33 and a rubber bushing 34 which is compressed around the end of the tubular axle 22 by a lower half bearing housing 35. As best shown in FIG. 7, the upper half bearing housing 33 is formed as an end continuation of the bottom wall 30 of its walking beam 28, the crest of this upper half bearing housing 33 being welded to the end of its companion top wall 29, as indicated at 36. The sides of each lower half bearing housing 35 are secured to the bottom wall 32 of its frame walking beam 28 by the usual bolts (not shown). The rubber tired wheels 25 are journalled on the ends of the axles 22.

At its enlarged center each frame walking beam 28 is connected by a rubber bushed bearing, indicated generally at 38, to the corresponding end of a cylindrical cross rod in the form of a tube 39. This tube can be reinforced at its center by a metal sleeve 40.

While each rubber bushed bearing 38 can be of any suitable construction, as best shown in FIG. 9, each comprises a pair of spaced abutment rings 41 welded to each end of the cross rod 39, 40 and confining between them a rubber bushing 42 which embraces the reinforcement 40 of the cross rod 39. The bottom of the periphery of each rubber bushing 42 is compressively embraced by a semicylindrical bottom half bearing housing 43 formed in the top wall 29 of its frame walking beam 28. The top of each rubber bushing 42 is compressively embraced by an upper semicylindrical half bearing housing 44, secured to the lower half bearing housing by bolts 45.

The opposite ends of the cross rod 39 resiliently support the opposite ends of a pair of spaced cross bolsters 48 extending transversely of the line of travel. Each is preferably of rectangular tubular form in cross section and they are arranged equidistant from, and in a horizontal plane above, the cross rod 39. These cross bolsters 48 are fixed to, and support the lower horizontal round plate 49 of a turnplate structure 50. The upper rectangular plate 51 of this turnplate structure is fixed to the subframe 19, and through this subframe to the parallel channel beams 13 which form the bottom support for the container or cargo body A. The bottom round turnplate 49 is shown as having a vertical bearing hub or sleeve 52 at its center. A headed bolt 53 extends through this bearing sleeve or hub and also through the upper circular turnplate 51 to hold them together, but permitting their relative planar rotation.

The opposite ends of the cross bolsters 48 project outwardly beyond the frame walking beams 28 and into the spaces between the tires 26.

The resilient support for the container or cargo body A on the cross rod 39 is arranged in these spaces and comprise two rows of helical compression springs 60. Each of these arrays extends transversely of the line of travel and is arranged at the corresponding side of the vehicle. Each array supports an inverted U-shaped saddle 61 which bridges the space between the ends of the cross bolsters 48 and is welded thereto. This saddle has a rectangular top 62 and depending rectangular sides or legs 63 which are reinforced by vertical ribs 64 which can also be welded to the ends of the cross bolsters 48. These sides 63 of each saddle 61 project down below the ends of the cross tube 39 which they embrace. Each row of first stage helical compression springs 60 rests on a horizontal rectangular plate 65. Each plate 65 penetrates and is welded to spaced vertical rectangular plates 66. These plates 65 are also penetrated by and welded to the cross rod 39. The vertical edges of these plates are welded to upright guide plates 67 which are parallel with the cross rod 39.

The opposing faces of the sides 63 of each saddle 61 are lined with low friction wear plates 69. The opposing faces of these low friction wear plates contact the guide plates 67. It will therefore be seen that the ends of the cross rod 39 is guided in its vertical movement by the vertical side plates or legs 63 of the saddle 61; the low friction wear plates 69 and the vertical guide plates 67 which are fixed to the cross rod 39. Spreading of the sides or legs 63 of the saddles 61 can be prevented by U-shaped bottom plates 73 bolted thereto. Each pedestal plate 65 and the top 62 of the saddle 61 can be provided with opposing conical or cup-shaped protrusions 74 and 75 which severally center the first stage helical compression springs 60.

RAILROAD TRUCK—FIGS. 1-6

To convert to railroad service, the undersides of the frame or walking beams 29 of the highway truck G mate with the upper sides of the frame of walking beams of the railroad truck F, the railroad truck being dropped off by gravity, or the container or cargo body A and its attached highway truck G being lifted in converting to and from highway service.

The frame of the railroad truck F comprises essentially two main longitudinal side frame beams 80 which are of I-beam form in cross section. The central parts 81 of these side frame beams are depressed and are connected to their higher end parts 82 by inclined portions 83 which converge downwardly toward each other and provide top wedge faces 84 which snugly fit the upwardly diverging wedge faces 32 of the highway frame walking beams when the highway and railroad frames G and F are brought into mating or nesting relation.

The central portions 81 of the railroad truck main longitudinal side frame beams 80 are connected together by a spaced pair of cross I-beams 85. On each cross I-beam 85 a horizontal pillow box 86 is welded. The upper faces of these pillow boxes are coplanar with the top faces of the upper flanges of the central parts 81 of the main longitudinal side frame beams 80, as best shown in FIG. 10.

At one end of the railroad truck F, its main longitudinal side frame beams 80 are cross connected by a pair of channel beams 88, the channels of which oppose each other. The ends of these channel cross beams 88 extend outwardly from the main longitudinal side frame beams 80 and are end connected together by I-beams 90 to form rectangular spaces housing the flanged railroad wheels 91.

Each pair of these railroad wheels are connected by a railroad axle 92 fixed thereto. The end of each axle is journalled in a roller bearing (not shown) contained in a rectangular journal box 93. Each of these journal boxes 93 is mounted in a conforming rectangular open bottomed housing 94 by means of a stabilizer which forms an important feature of the present invention.

Each journal box housing 94 is fixed, centrally, below each outboard I-beam 90 of the railroad frame and is made a rigid part thereof by gussets 95 and 96 welded thereto. The bottom is open and has a removable bottom plate 98 bolted to its flanges 99. This bottom plate has spaced rising end walls 100 extending transversely of its axle 22 and forming stops for the stabilizer means as hereinafter described. The purpose of these removable bottom plates 98 is to permit the entire axle 22 together with its wheels, journal boxes and stabilizer means, to be dropped from the railroad truck F without disturbing any other parts.

RAILROAD STABILIZER MEANS—FIGS. 2-6

The purpose of this stabilizer means is (1) to provide load transfer among the railroad wheels; (2) to provide automatic steering and optimum alinement of the axle assemblies, particularly around curves and switches; (3) to insure that each railroad wheel is under pressure contact with its rail at all times and reduce its dynamic action to near zero; (4) to permit resiliently controlled axle movement transversely of the line of travel and (5) to permit limited axle movement vertically, and lengthwise of the line of travel with reference to the railroad frame F. All these lead to (a) reduction in the vertical destructive action on the rails in traversing soft spots, such as abutting rail ends; (b) reduction in both wheel and track wear; (c) elimination of wheel lift and possible derailment; (d) a smoother and more vibration-free ride and (e) the resulting economies in less load damage and fuel requirements. All of these are particularly applicable to the combined highway-railroad freight cars shown.

To this end, a grooved rectangular resilient rubber pad 101 is interposed between the bottoms of each journal box 93 and the top of the companion bottom plate 98. This pad is under constant pressure and its top and bottom grooves 102 permit its ready vertical and horizontal flexure under varying loads.

A pair of tubular resilient rubber rollers 103 are interposed between the top of each journal box 93 and the underside of the top wall 104 of its housing box 94. These resilient rubber rollers are arranged parallel with the axles 92 to permit horizontal movement of their journal box 93 transversely of the axles or lengthwise of the line of travel. However, such movement is strictly limited by a rapidly increasing resistance to their lateral rolling movement. Such resistance is provided by wedge faces 105 and 106 on the top of each journal box 93 on each side of each resilient rubber roller 103 and forming a centering groove therefor. Companion wedge faces 108 and 109 are provided on the bottom of the top wall 104 of each journal box housing 94. These top wedge faces also provide a centering groove for each resilient roller 103.

The lateral spring resistance rate of the rollers 103 is increased or decreased by simply changing the pitch of the wedge faces. This is important in order to provide the maximum allowable resistance for automatic steering, but not to exceed the limit of the coefficient of friction between the railroad wheel 91 and the railroad track C. These rollers are also shaped to provide a constant vertical deflection rate through one inch of deflection.

The deflection rate of the rubber pad 101 is far below that of the rubber rollers 103 but this pad has sufficient capacity to keep the axle 92 and journal box 93 properly located.

Such movement of each journal box 93 with reference to its housing 94 is limited by spaces 110 therebetween. Horizontal movement of each journal box 93 with reference to its housing 94 in the opposite direction is limited by the spaces 111 therebetween. Since each bottom resilient pad 101 is continuously under vertical pressure, the resilient rollers are too. This continuous pressure insures rail contact of each railroad wheel 91 at all times, while the strictly controlled rolling movement of the resilient rollers 103 permits self-steering of the axles 92 around curves and switches, all as hereinafter described in greater detail.

CAR COUPLERS—FIGS. 11 and 12

In railroad service, the front end of each container or cargo body A is both coupled to and supported by the rear end of the next preceding container or cargo body A. In this manner one railroad truck F, and also the highway truck G mounted thereon has double service and eliminates the need for a separate railroad truck for the front end of each container or cargo body A as was required with the convertible vehicles of my said co-pending application Ser. No. 239,503. The present coupler also serves to keep the container or cargo body A frame stresses low and provide low coupler weight, considering its service.

At the forward end of each container or cargo body A, a male coupler member, in the form of a casting 115, is welded in the opposing channels of the longitudinal channel beams 13 under and supporting the cargo body A. For lightness this casting has a backbone 116 from which spaced arms 118, 119 project horizontally into these opposing channels in which they are welded. The backbone portion 116 is continued forwardly to provide a rigid tongue 117 which projects about a foot forwardly from the front wall of the cargo body A. In railroad service, for air resistance, as well as train compactness, it is desirable to space the cargo bodies A as close together as will enable them to follow switches. The present coupler permits such spacing of about eighteen inches.

Conversely, at the rear end of each container or cargo body A, a female coupler member in the form of a casting 120 is welded in the opposing channels of the longitudinal channel beams 13 under and supporting the cargo bodies A. For lightness this casting has a backbone 121 from which spaced arms 122, 123 project horizontally into the opposing channels in which they are welded. The backbone portion 121 is continued rearwardly to provide a socket member 124 which receives the rigid tongue 117.

The socket member 124 has a rearwardly opening semicircular socket 125 which is also open at its top. This receives the semicircular front end 126 of a companion tongue 117. Each tongue 117 has a vertical hole 128 therethrough which is concentric with its semicircular front end 126. Each hole 128 receives the upper end of a coupling pin 129 which is fixed to each female coupling member to project upwardly concentrically in the socket 125.

In coupling a train of cargo bodies A, each tongue 117 is brought into juxtaposition with the socket 125 in the socket member 124 of the next preceding cargo body A. The front end of the cargo body A being coupled, together with its tongue 117, is then lifted; its hole 128 positioned over the pin 129; and then dropped onto a resilient rubber pad 130.

SECOND STAGE SPRING SUSPENSION—FIGS. 2 and 7–10A

For railroad service another array of helical springs 135 is provided, this array being completely inoperative in highway service. This second stage array has approximately the same resilient resistance as the two arrays of helical springs 60 in the highway truck G. To this end the two arrays of highway springs 60 total six in number and the second stage array of springs 135 for railroad service are also shown as being six in number and of the same strength.

The reason for this is that in highway service the helical springs 60 of the highway truck G serve only to carry a part of the highway load. The other part of the highway load is carried by the highway tractor (not shown). However, in railroad service each railroad truck F carries the entire load of each cargo body A. Accordingly, about twice as much resilient resistance is required in railroad service, half of this being supplied by the arrays of first stage springs 60, and the other half being supplied by the array of second stage springs 135.

These second stage helical compression springs 135 are in two spaced rows, one under each of the cross bolsters 48. They are suspended from these cross bolsters, but are maintained under a degree of compression by helical tension springs 136 severally contained therein. A bottom plate 138 is arranged under and supports each row of second stage springs 135. On each bottom plate is welded a row of cups 139 which severally seat the bottoms of the helical compresson springs 135. The tops of these helical compression springs 135 are severally contained in caps 140 which can be welded to the underside of a horizontal plate 141. This plate has parallel upright walls 142 which fit and are welded to the opposing sides of the cross bolsters 48 of the highway frame G. The plate 141 can be reinforced by suitable gussets 143 and 144.

Each tension spring 136 has tapered corkscrew ends 145. Each top corkscrew end 145 contains the flaring head 146 of a bolt 147 which extends through and is secured to the bottom of its cap 140 and the plate 141 by a nut 148.

The bottom corkscrew end 145 of each helical tension spring 136 contains the flaring head 149 of a bolt 150, the bolts 147 and 150 being identical except as to length. Each bottom bolt 150 secures the lower end of its helical tension spring 136 to its bottom cup 139, each row of which, as previously noted, is welded to the top of the corresponding bottom plate 138.

In highway service, the array of secondary compression springs 135 merely go along for the ride as shown in FIG. 9. They bear downwardly against the bottom plates 138 which are suspended from the highway truck frame by the tension springs.

However they become effective when the cargo containers A are coupled together in a train for railroad service. In such coupling, the bottom plates 138 of the two rows of helical compression springs 135 automatically position themselves directly above the cross bolsters 48 and pillow blocks 86 of the preceding cargo container A. As the front end of the cargo container A is being lowered to couple the hole 128 in its front tongue 117 onto the pin 129 (FIGS. 11 and 12) of the forward cargo container A, the plates 138 automatically drop onto the pillow blocks 86 and cross bolsters 48 of the preceding cargo container A. Such seating is insured by upright positioning guide fingers 151 welded to the sides of the cross bolsters 85.

SINGLE AXLE COUPLER DOLLY—FIGS. 13 and 14

The purpose of this dolly D is to permit coupling of any vehicle of the present invention onto the rear end of any conventional locomotive, freight or passenger railroad car. For this purpose it has a conventional railroad coupler 155 at its front end and carries a coupler member 120a as shown in FIGS. 11 and 12 for coupling to any of the convertible vehicles of the present invention. Its having only a single axle eliminates the need for any turnplate structure since a turnplate is only required with a two axle bogie to enable it to follow track curves and switches.

The single axle 156, with a pair of flanged railroad wheels 158 fixed thereto, ride along the railroad track C. the ends of the axle are journalled in journal boxes 159, each of which is clamped to the underside of a leaf spring 160 by a top clamping plate 161. Through rubber pads 162 the ends of each leaf spring support the outboard ends of cross beams 163 which carry a flat frame 164. Radius rods 165 between the rear cross beam 163 and clamping plates 161 guide the axle 156 in its vertical movement.

Each coupler member 120a is in the form of a casting secured on the flat frame 164. Its front end 166 is higher than its rear end 168 to provide a rearwardly facing wall 170 near its front end. The bottom of this wall defines a flat horizontal upper face 171 for the casting 120a.

The higher front end or riser 166 is provided, in its rear wall 170, with a semicircular rearwardly opening socket 172 which is closed at its top. This socket 172 conforms to the sockets 125 of the socket members 120. This socket 172 receives the tongue 117 of the coupling member 115 of any of the cargo containers A.

However the top of the socket 172 is preferably closed by a cover 173 and it is not provided with a coupling pin. Instead, the flat top face 171 of the socket member 120a is adapted to support the greased horizontal fifth wheel plate 17 at the bottom front end of any of the cargo bodies A and its central depending headed latch pin 18. This fifth wheel plate and its latch pin are identical to the corresponding parts of a conventional fifth wheel connection between a highway tractor and its conventional trailer (both not shown).

For connection to the coupler dolly D, this headed pin 18 is received in a slot 173 provided in the coupler member 120a. To latch the cargo container A to the coupler dolly D, a sliding latch bar 174 can be provided in a slideway which is positioned so that the latch bar can be slid behind the headed fifth wheel pin 18, as shown in FIG. 14.

For moving the coupler dolly D about the trackage C, particularly by itself, grooved helper wheels 175 can be provided to support its forward end. They can be brought into engagement with the tracks D by mounting them at the bottoms of the telescopic legs 176. These can be mounted at the ends of outboard side arms 178 projecting from the flat frame 164 of the dolly D.

STRUCTURES NOT ILLUSTRATED

For simplicity, a number of mechanisms, mostly detailed in my said copending application Ser. No. 239,503, are not included here as they are ancillary to the present inventive concept.

With the substitution of low friction plates 67 for the high friction plates 86 of the application, shock absorbers for the highway spring suspension are desirable.

For highway service the turnplate structure 50 must be locked against action. Such a lock is illustrated in FIG. 6B of the application.

In rail travel it may also be desirable to lock the railroad truck and highway truck together, as with the pin 156, FIG. 12 of the application.

For gravity separation, the hook 146, FIG. 24 of the application would be required.

Brake torque arms, such as the arms 89 of the application, are also required.

OPERATION—In Highway Service

The cargo containers or bodies A are connected to conventional highway tractors in the same way as is now common practice. Thus, with the front end supported on the extended leg or jack 15, a conventional highway tractor (not shown) is backed under its front end until its greased fifth wheel plate contacts the greased fifth wheel plate 17 of the cargo body A. The highway tractor fifth wheel then seizes the depending headed pin 18. On retracting the telescopic supporting leg or jack 15, the coupled tractor and cargo body can be driven off.

In Converting to Railroad Service

To convert to rail service, it is merely necessary to drop each rubber tired highway truck G onto a railroad truck F. In doing so the telescopic leg or jack 15 may be used. The walking beams 28 of the highway truck G drop onto the longitudinal beams 80 of the railroad truck F and are nested thereon by the wedge faces 84.

A gravity mounting and dismounting of the cargo bodies A is described in my said copending application Ser. No. 239,503. This is preferred, but for simplicity it will be assumed here that this is done by suitable lifting devices as are now in common use.

Of First Stage Spring Suspension—Highway and Railroad

The first stage helical compression springs 60 contained in the highway truck G are used for both highway and railroad service with light or heavy loads. In railroad sevice, the upward movement of, say, a front railroad wheel 91, raises the corresponding hub of the axle 92 journalled thereon. Through the corresponding journal box 93 and its housing 104, this raises the front end of the main longitudinal side frame beam 80 of the railroad truck F. This movement is transmitted through the rubber rollers 103 and rubber pad 101 (FIGS. 5 and 6), the operation of which will be detailed later.

Since a corresponding frame walking beam 28 of the highway truck G is nested in this railroad side beam 80, the front end of the highway truck walking beam 28 is also lifted.

This upward movement of the forward end of this walking beam 28 raises its rubber bushed bearing 38, and the corresponding end of the cross rod 39. The rubber bushing 41 for this bearing is of sufficient radial thickness to permit the required rocking movement of the walking beam 28 and provides a friction-free bearing which is free from lubrication require- ments.

The upward movement of this one end of the cross rod 39, through its rectangular pedestal plate 65, distorts upwardly the array of first stage helical compression springs 60. This force is transmitted to the subframe 19 and container or cargo body A, through the horizontal top 62 of its saddle 61 and its legs 63 and their reinforcing ribs 67. The saddle 61, together with its side legs and reinforcing ribs is welded between the ends of the cross bolsters 48, which are therefore also lifted. Through the turnplate structure 50, this lifts the subframe 19, cargo body or container A and its load, whereby the load is yieldingly supported during such action.

During highway travel, the same action takes place, except that the force is transmitted to the front end of the walking beam 28 by the corresponding rubber tired highway wheel 25 and its axle 22.

Of Stabilizer and Load Transfer Means

Everyone has watched a passing freight train sink abutting rail ends into the ground each time a wheel passes over them. The abutting rail ends constitute soft spots and such visible downward rail movement is repeated each time each wheel passes over each pair of abutting rail ends the full length of the line.

Such rail-end depression is in part relieved by the longer effective length of the main longitudinal side frame beams 80 of the railroad truck F, i.e., the distance between its axles 92. The present frame beams are longer than in ordinary freight bogies in order to accommodate the highway trucks G therebetween. They can also be made longer deliberately, with such longer effective lever arms provided by the opposite ends of each railroad truck side frame beam 80, there is less downward thrust as either of its railroad wheels 91 passes over a rail joint.

The operation of the stabilizer means between each end of each railroad axle 92 and the frame of its railroad truck F also reduce such rail deterioration, as well as reducing rail track wear and the danger of derailment from railroad wheel hop.

In the action of such stabilizer means, the upward movement of each end of each railroad axle 92 raises its journal box 93. Through its resilient bottom rubber pad 101 and top resilient rubber rollers 103, all of which are under constant vertical compression, this raises the corresponding journal box holder 94 which forms part of the railroad truck frame.

The fact that the journal boxes 93, and hence the load pivot centers, are outboard from the railroad wheels and tracks, creates a leverage condition tending to lift the railroad wheel on the opposite end of each axle. Hence with the track uneven vertically, along with a rigid railroad truck frame, it becomes necessary to keep a downward pressure on all railroad wheels 91 and journal boxes 93, sufficient to overcome the lifting force, created by the opposite railroad wheel, when running on uneven tracks. Assuming a maximum static journal box load of 11,000 lbs. unladen and 15,000 lbs. fully laden, the lifting power of each journal box 93, in lifting the opposite railroad wheel 91, due to its outboard relation to the track C, is approximately a ratio of about 7 to 1. There will be 22,000 lbs. divided by 7 or 3,142 lbs. of lifting power exerted on the opposite railroad wheel, if this opposite wheel were unsupported. Of course, the weight of this unsupported wheel 91, its journal box 93 and axle end, which is around 700 lbs., must be subtracted from the 3,142 lbs., leaving a lifting balance of around 2,440 lbs. Thus, merely through the journal boxes 93 being outboard from the railroad tracks, a lifting force is exerted on the opposite railroad wheel on its passing over a rail joint or "soft spot." This reduces the track damage as each wheel passes over a rail joint.

At the same time, such lifting force cannot be permitted to result in wheel hop or possible derailment. To this end each railroad wheel exerts a minimum downward pressure on its track. This is provided by its resilient rubber rollers 103 pressing downwardly on its journal box 93. To this end the downward force of the resilient rollers 103 is greater than the upward force of the companion resilient pad 101.

These elastic rollers 103 are shaped to have a constant resilient rate of deflection in supporting substantially the entire maximum load, such deflection not greatly exceeding an inch under maximum static load. Their action is as a stabilizer means to insure that all of the railroad wheels are under constant pressure with the rails at all times. The dynamic action of these elastic rolls 103 is near zero so they do not have any springing action, as part of the main spring suspension, in suspending the load.

These elastic rollers 103 also provide self-steering of the railroad axles 92 in negotiating switches and curves. Since each pair of railroad wheels 91 are fixed to their railroad axle 92, the differential length of travel of each pair of wheels in rounding the longer outside and shorter outside rails of each curve tends to bring their axle to a self-steering position. This is permitted by the resilient pad 101 and resilient rollers 103 supporting each axle end. After negotiating a switch, the rubber pad 101 resumes its upright position and the rollers 103 resume their centered position in their grooves 105, 106 and 108, 109 thereby to bring the axle 92 back to its straight line travel position.

The degree of such rolling movement of the resilient rollers 103 in providing such self-steering is controlled by the pitch of the wedge faces of the sides of the grooves 105, 106 and 108, 109 in which the rollers are arranged.

Due to the fact that the lateral coefficient of friction beween the steel railroad wheels 91 and the steel railroad rails C is limited to 2/10 of the weight applied, the sidewise resistance provided by the resilient rollers 103 must not exceed this coefficient level when the containers A are empty or fully loaded. Otherwise, the railroad wheel 91 would slide on its rail. With such sidewise resistance being variable, due to the pitch of the wedge faces 105, 106 and 108, 109, and the weight of the loads applied, the maximum roller resistance can be provided whether the cars are light or loaded. The pitch of these wedge faces is important since with heavier loads, it takes more force to push the resilient rollers 93 up the wedge faces.

The resilient rubber rollers 93 and their pad 101 permit and stabilize the movement of each end of each axle laterally and longitudinally of the line of travel, as well as vertically. Each bottom pad 101 is designed for such service. Each rubber pad 101 will have a vertical deflection rate of about 1/7 of the top resilient rubber rollers 103, this putting these top rollers 103 under compression at all times. Under no-load, the top resilient rollers 103 will be deflected, say, 1/7 of an inch with no load applied. As loads are applied the resilient top rollers 103 will be deflected proportionally, while their bottom resilient pad will be gradually unloaded. However, the top resilient rollers 103 will never be deflected enough to completely unload the bottom resilient pad 101. This ratio of spring rates insures stability at all times under all conditions.

It will also be noted that spaces 110 permit lengthwise axle movement ample to permit automatic steering and alinement, and also retain stability at all times and under all conditions.

In Coupling Train of Cargo Containers—FIGS. 1, 2, 11 and 12

Figure 1:
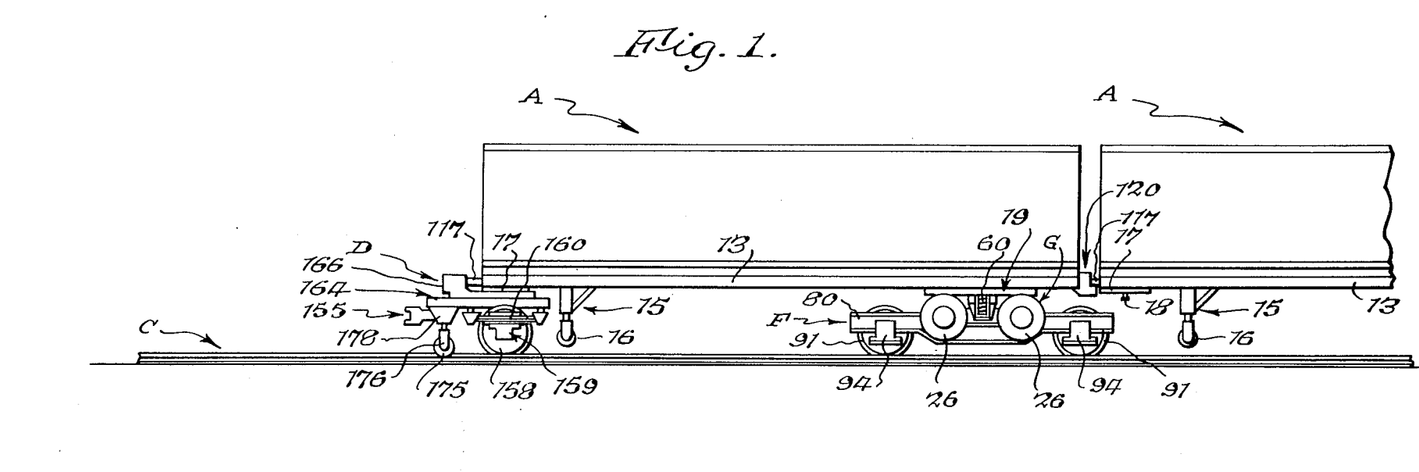
FIG. 1 is a side elevational view of a pair of coupled cargo containers about to be pulled along a railroad track, the front end of the rearward container being coupled to and supported by the rear end of the forward container, and the front end of the forward container being coupled to and supported by a single axle railroad coupler dolly. This dolly has a conventional railroad coupler at its front end for attachment to a diesel locomotive or any of its cars.
Figure 2:
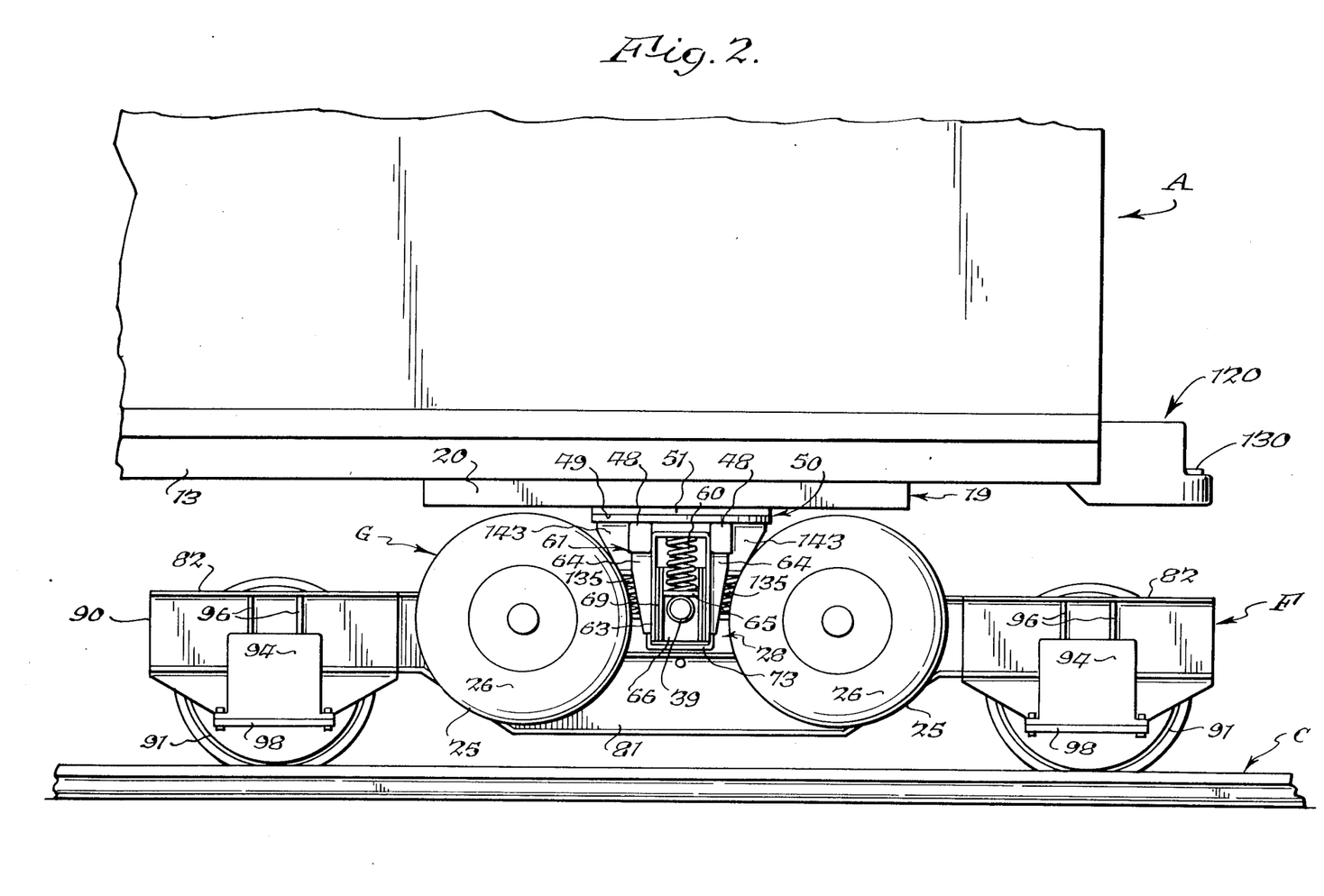
FIG. 2 is a similar view, greatly enlarged and detailing the highway wheeled frame cradled in the railroad wheeled frame.
Figure 3:
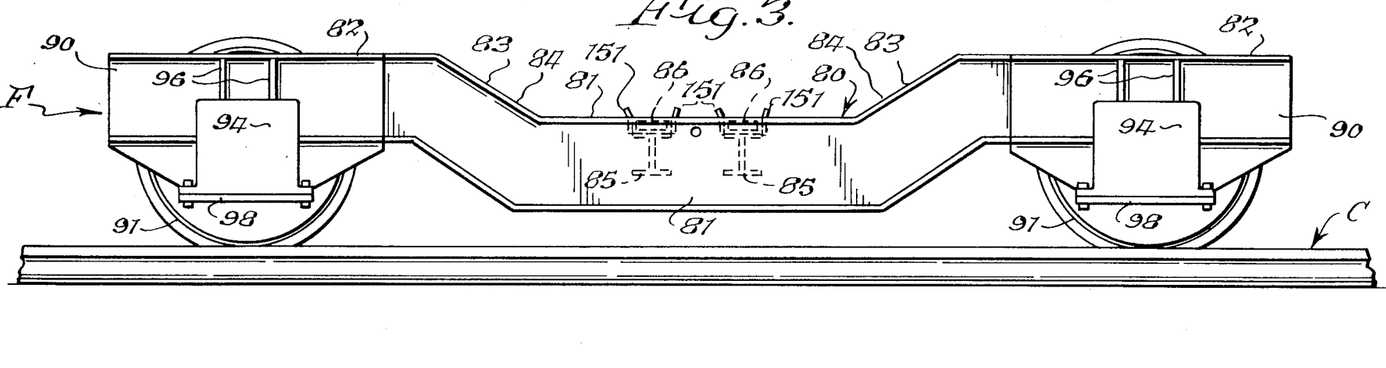
FIG. 3 is a side elevational view of the railroad wheeled frame on railroad tracks.
Figure 4:
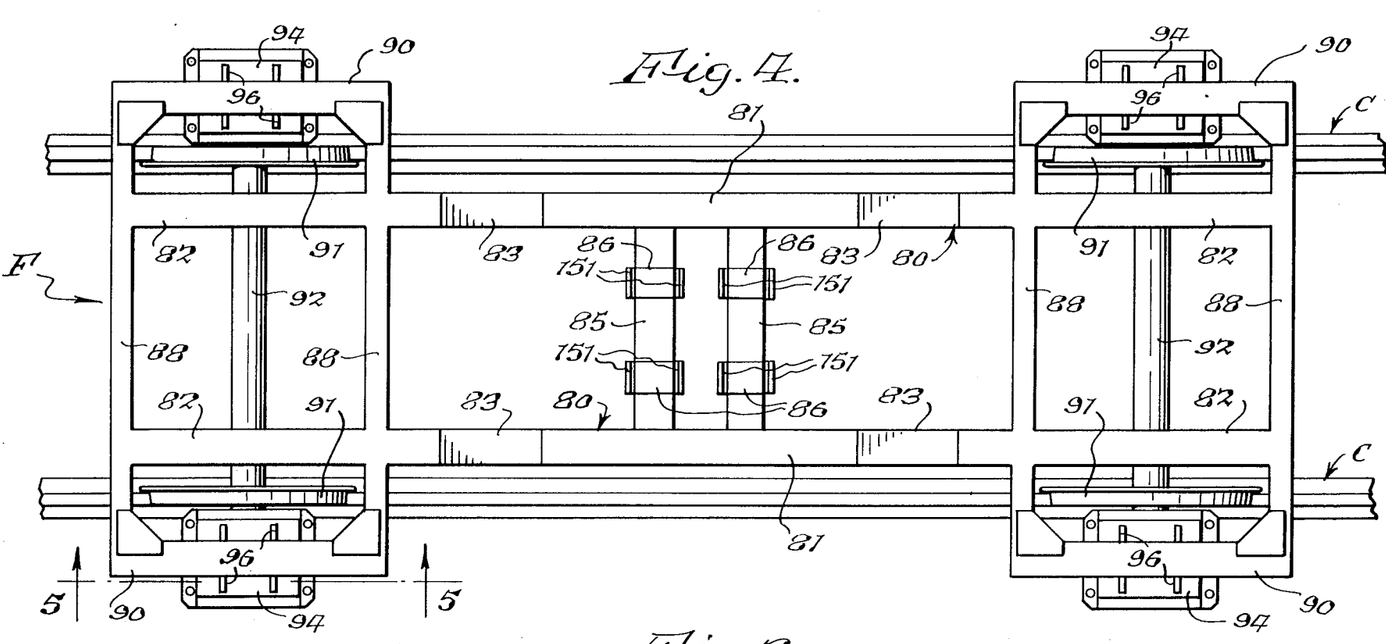
FIG. 4 is a top plan view thereof.

Such coupling occurs with one cargo container A, equipped for railroad service as shown in FIG. 1, being arranged on a railroad siding. A similarly equipped cargo container A, with its wheeled leg or jack 15 extended, is placed on the siding in rear of the first cargo container. The front end of the second cargo container is then lifted high enough to clear the upright coupler pin 129, and it is moved forwardly to funnel its front coupler tongue 117 into the semicircular socket 125 of the first cargo container A. When the semicircular front end 126 of this tongue 117 comes into abutting relation with this socket, the pin 129 and hole 128 are in vertical alinement. So it is merely necessary to drop the front end of the cargo container being coupled onto the resilient pad 130, the upright pin 129 entering the hole 128.

The coupler is substantially service free requiring only replacement of the pad 130 after years of service, it being stressed to only about 250 lbs. per square inch. It, and the pin 129, will accommodate all movement requirements—body roll, curves and switches, and fore-and-aft movements. The coupling pin 129 is high enough to render any latch unnecessary. The coupler will adequately support the entire front half of the cargo container A even during deceleration when the downward load on it is greatly increased.

As previously noted, the couplers also permit as close spacing as the size of the cargo containers A, in negotiating switches, permit. This reduces wind resistance, and makes for a shorter train.

Of the Second Stage Springs—FIGS. 7-10A

In highway service, the second stage helical springs 135 merely go along for the ride. They ride, as best shown in FIG. 7, on the bottom plates 138 suspended from the bottom of the highway trunk C by the helical tension springs 136. As the highway truck G, and its cargo container A, are being dropped onto their railroad truck F, these bottom plates 138 engage and fit onto the pillow blocks 86 welded to the cross I-beams of the frame of the railroad truck F. They are, of course, compressed and serve as the resilient support for that part of the load that is carried by the highway tractor (not shown) in road service.

Of The Coupler Dolly D—FIGS. 1, 13 and 14

This dolly is to enable the convertible highway-railroad vehicles of the present invention to be coupled to the rear end of a freight or passenger train or to its locomotive. For this purpose the dolly has a standard railroad coupler 155 at its front end.

On the siding, the rear end of the dolly D is brought under the front end of the cargo container A to be coupled thereto. The front end of the cargo container is then dropped so that the greased under surface of its conventional fifth wheel part 17 comes to rest on the flat top surface 171 of the coupler part 120a of the dolly. The dolly and cargo container are then moved toward each other so that the semicircular front end of the tongue 117 of the cargo container enters the socket 172 of the dolly. This causes the depending headed pin 18 of the conventional fifth wheel part 17 of the cargo container A to enter the slot 172a of the dolly coupler part 120a. The sliding bar 174 of the dolly is then pushed in to be behind the headed pin 18 and lock the dolly and cargo container together. Through its conventional railroad coupler 155 the dolly and its attached cargo container can then be coupled to the rear of a locomotive or any of its cars.

Since the dolly is single axled and incorporates automatic steering and alinement features, it freely accommodates rail curves and switches, and centers itself on straight tracks without the necessity of a turnplate structure, such as the turnplate 50 for the cargo containers A and its railroad truck F.

The automatic steering is provided in this single axle dolly D by the rubber pads 162 between the ends of the leaf spring 160 and the ends of the frame cross beams 163 as well as the rubber rings or grommets at each end of the radius rods 165. These rubber rings or grommets are stiff enough to keep the dolly axle in proper location, but soft enough to accommodate automatic steering before the coefficient of friction between the dolly wheels 158 and the railroad track is exceeded.

The disclosure comprises the pair of containers (A); a pair of first axles (22 highway) each permanently connected to one end (rear) of each container (A); rubber tired highway wheels (25) therefor; a pair of second axles (92 railroad); railroad wheels (91) therefor; an interengaging structure (the highway walking beams 28 nesting in the railroad truck side bars 80) for selectively mounting the first pair of axles (22 highway) on each of the second pair of axles (92 railroad); and a coupler (the coupler 115, 120) for detachably supporting the other (front) end of either of said containers (A) on the first pair of axles (22 highway) of the other of said containers (A).

Also the interengaging structure comprise first frame members having an under surface (the highway walking beams 28) on the first pair of axles (highway axles 22); a second frame members having an upper surface (railroad side bars 80) on the second pair of axles (railroad); the under surface of the first frame members (highway walking beams 28) being in close face-to-face relation with the upper surface of the second frame members (railroad frame side bars 80) to provide a unitary highway and railroad frame structure (FIG. 2); and wedges (the wedge face 32, 84) restraining the first frame members (highway walking beams 28) against horizontal movement with reference to the second frame members (railroad frame side bars 80).

The disclosure also comprises a two stage spring suspension for the loaded containers (A); the first stage being a vertically acting suspension (coil spring 60) interposed between each walking beam journal (rubber bushed bearing 38) and the corresponding container (A); and the second stage (coil springs 135) being interposed between the second frame members (railroad frame bars 80) and its container (A).

Figure 5:
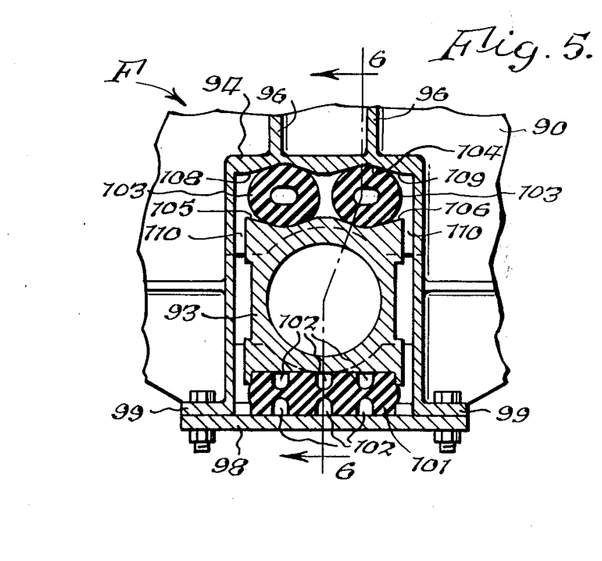
FIG. 5 is a further enlarged vertical sectional view taken generally on line 5—5, FIG. 4.
Figure 6:
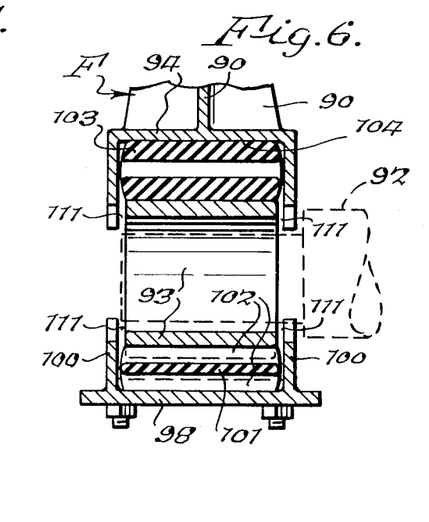
FIG. 6 is a vertical sectional view taken generally on line 6—6, FIG. 5.

The disclosure also comprises the stabilizer pictured in FIGS. 5 and 6 as being independent of the main spring suspension (coil springs 60, 135) which form substantially the sole resistant support for the loaded containers (A) and are in the form of resilient spacers (101, 103) between each journal box (93) and its holder (94) permitting movement of its journal box (93), axle (92) and railroad wheels (91) relative to their holder (94) to render the railroad axles (92) self-steering in rounding rail curves and switches by permitting a very restricted movement of each end of each railroad axle (92) both axially and transversely thereof.

I claim:

1. A system for the combined transportation of a cargo by highway and railraod comprising a pair of containers for carrying said cargo, a pair of first axle means each permanently connected to one end of each container, rubber tired highway wheels supporting each of said first axle means during highway travel, a pair of second axle means, railroad wheels supporting each of said second axle means, interengaging means for selectively mounting and dismounting each of said first axle means on each of said second axle means, and means for detachably supporting the other end of each of said containers on the first axle means of the other of said containers, said interengaging means comprising a first frame means on said first axle means and having an under surface, a second frame means on said second axle means and having an upper surface, the under surface of said first frame means being in close face-to-face relation with the upper surface of said second frame means to provide a unitary highway and railroad frame structure, means restraining said first frame means against horizontal movement with reference to said second frame means, first stage spring means interposed between each of said first frame means and the container thereon and carrying the entire load between said container and said first axle means when said container is not mounted on said second axle means, and a second stage spring suspension interposed between each second frame and the container thereon and carrying only part of the load of said container when said first axle means is mounted on said second axle means with the remainder of the load of said container being carried by said first stage spring means, whereby said first and second stage spring means share the entire load of said container, said second stage spring means being permanently connected to its first frame means and being detached from the second frame means when its first frame means is detached from said second frame means.

2. The combination set forth in claim 1 wherein said first axle means each supports the rear end of its container and wherein, in railroad service, the front end of one container is coupled to and supported by the rear end of the other container and said second stage spring means serves to resiliently support the coupled ends of both of said containers.

3. The combination set forth in claim 1 wherein each of said second stage spring means comprises an array of helical compression springs seated on plate means, said plate means being positioned to engage said second frame means when each first and second frame means are attached to each other, and means restraining downward movement of each plate means when said first and second frame means are detached from each other.

4. The combination set forth in claim 3 wherein said restraining means comprise helical tension springs severally housed within said helical compression springs and connected to in part counteract the effect of said helical compression springs.

* * * * *